June 20, 1967 K. HACK 3,326,342
FREE WHEEL CLUTCH
Filed June 24, 1965 4 Sheets-Sheet 4

United States Patent Office 3,326,342
Patented June 20, 1967

3,326,342
FREE WHEEL CLUTCH
Karl Hack, Werastr. 43, Reutlingen, Germany
Filed June 24, 1965, Ser. No. 466,527
Claims priority, application Germany, June 27, 1964,
H 53,108
10 Claims. (Cl. 192—45.1)

The present invention relates to a freewheel clutch in which between an outer running surface and an inner running surface, which in most instances are cylindrical, there are arranged clamping members which exert a clamping action when the freewheel arrangement rotates in a direction counter to its normal direction of rotation. The inner running surface may be formed by a drive shaft and the outer running surface may be formed by an output shaft or a hub.

Heretofore known freewheel clutches of the above mentioned type have the drawback that the clamping surfaces of the clamping members which engage the running surfaces of the inner or outer shaft are subjected to a considerable wear during the freewheeling of the freewheel clutch. As a result thereof, gradually a surface is ground on the clamping surfaces which greatly interferes with a proper operation of the freewheeling arrangement as soon as the degree of wear has reached only a relatively small magnitude.

It is, therefore, an object of the present invention to provide a freewheel clutch which will overcome the above-mentioned drawback.

It is another object of this invention to provide a freewheel clutch which while being simple in construction is very reliable in operation and in particular has a long life.

These and other objects and advantages of the invention will appear more clearly from the following specification in connection with the accompanying drawings, in which.

Figure 7:
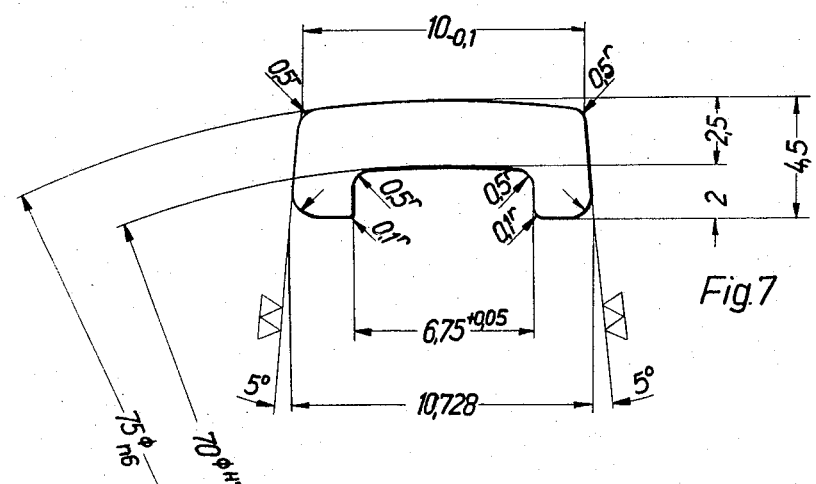
Figure 8:
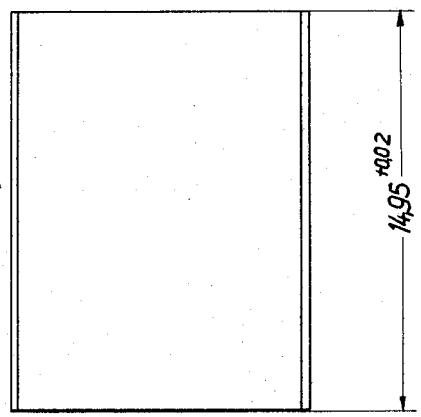

FIGS. 7 and 8 respectively illustrate by way of example a side view and a top view of a clamping shoe as it may be used in connection with the present invention.

A freewheel clutch according to the present invention is characterized primarily in that those faces of the clamping member and the clamping shoe which face each other are designed as rolling surfaces, and that the sliding shoes are provided with arms extending in the direction toward the clamping member and when looking in the direction of rotation of the freewheel clutch are located in the front and in the rear of the respective clamping member pertaining thereto.

Thus, the present invention provides a freewheel clutch in which between the clamping member and the slide shoe there will occur a rolling movement whereby a freewheel clutch of highest precision is obtained as it may be used for instance for precision machines, such as screw winding automats.

The main difference of a freewheel clutch according to the present invention and heretofore known freewheel clutches thus consists in that the clamping members rest on the slide shoes pertaining thereto along rolling surfaces so that the clamping members when moving relative to said slide shoes roll thereon. This will assure that the interengaging surfaces of the slide shoes and clamping members cannot wear or wear only to a slight extent.

To reduce the wear of the clamping members and slide shoes is of particular importance because with increasing wear the clamping members will in clamped-in condition assume a more and more radial location. When the clamping members, however, have once reached a radial location when in clamping position, a safe engagement of the clutch is no longer assured because the clamping members can then move beyond the said extreme location whereby the clutch is again disengaged. On the other hand, the angle of the clamping members in clamping position with regard to the radial location thereof cannot be selected of any magnitude in view of the angle of friction determined by the properties of the material involved and the lubricants employed. If the angle formed by the clamping members in clamping position with regard to the radial location thereof is selected too large, a safe clamping of the clamping members can no longer be assured. The difficulty heretofore encountered thus consisted in so reducing the wear of the clutch that the clamping members when in clamping condition will within very close tolerances always assume about the same angle with regard to the radial location of the clamping members. This requirement has been met according to the present invention by the above mentioned fact that the clamping members roll relatively on the slide shoes.

According to a further development of the present invention, the clamping surface of the individual clamping member or the surface of the slide shoe facing the clamping surface of the clamping member follows a portion of the contour of a spiral which preferably increases continuously while that surface of the slide shoe or clamping member which engages the spiral-shaped surface is circular. In this connection it is important that the pitch angle between each pair of rolling surfaces pertaining to each other does not increase the angle of friction between the material of the clamping member and the material of the slide shoe, said angle of friction also being affected by the particular lubricant employed. When the clamping members and slide shoes are made of hardened steel, the angle of friction, when considering the lubricant to be employed, should preferably not be larger than 5 or 6°.

It is, of course, immaterial with regard to the present invention whether the spiral is provided with a uniform pitch angle at the outer surface of the clamping member or at the inner surface of the slide shoe. Preferably, however, the outer surface of the clamping member is spiral-shaped.

It is, of course, also possible that that part which comprises the spiral with uniform pitch angle is formed directly by the rolling part of the hub. In this instance either that surface of the clamping member which faces the hub or the corresponding hub surface is spiral-shaped, whereas the other rolling surface engaging the spiral-shaped surface follows the contour of a circle.

Figure 1:
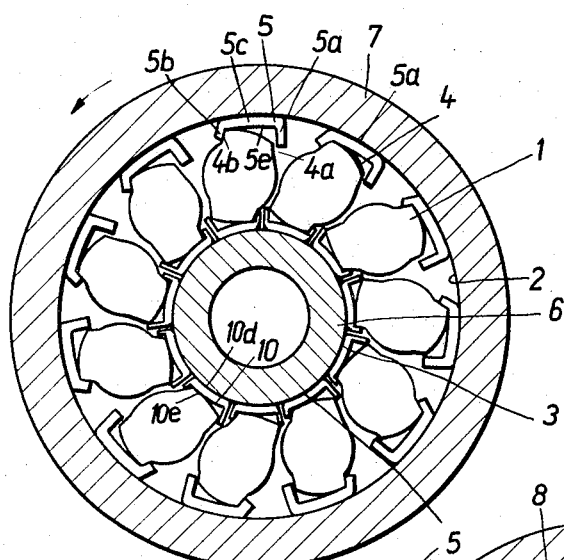
FIG. 1 represents a section through a freewheel clutch according to the present invention.

Referring now to the drawings in detail and FIG. 1 thereof in particular, the arrangement shown therein comprises primarily an output shaft 7 with an inner rolling surface 2 and an input shaft 6 with an outer running surface 3. The arrangement furthermore comprises clamping members 1 which are interposed between said running surfaces 2 and 3 and assume a nearly radial position. The clamping surfaces 4 of clamping member 1 are so arranged that in different inclined positions of the clamping members 1 a longer or shorter radial distance will exist between the respective rolling surfaces 2, 3 and the respective clamping surface 4. Between the clamping surfaces 4 of clamping members 1 and the respective adjacent running surfaces 2, 3 there are arranged U-shaped sliding members 5 which may be designed as bent sheet metal parts of wear-resistant material. As wear-resistant material in this connection there may be used hardened steel or powdered metal.

As will be seen from the drawings, slide shoes 5, 10 have their frictional surfaces 5d, 10d in engagement with the running surfaces 2, 3 respectively while the frictional surfaces 5d, 10d are curved in conformity with the running surfaces 2, 3. The curvature of the frictional surfaces 5d, 10d corresponds to a spiral with uniform pitch. In view of the spiral-shaped frictional surfaces 5d, 10d, the clamping angle of the clamping members 1 will when the latter wear, change only insignificantly so that it will always remain less than the angle of friction.

Figure 2:
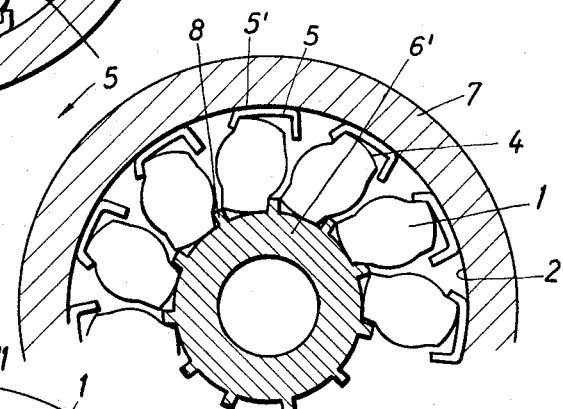
FIG. 2 is a section similar to that of FIG. 1 but illustrating a slight modification according to which the slide shoes arranged at the inner shaft of FIG. 1 are integral therewith.

Referring now to the embodiment of FIG. 2, the arrangement shown therein is particularly advantageous in connection with compact constructions and especially with freewheel clutches which have to rotate at very high speeds. More specifically, according to FIG. 2 and in contrast to FIG. 1, the inner slide shoes of FIG. 1 have been made integral with the drive shaft designated in FIG. 2 with the reference numeral 6'. The flanks of the slide shoes will with this embodiment form radial arms 8 of shaft 6'. Analogously, it is also possible to make the slide shoes adjacent the output shaft 7 integral therewith while providing slide shoes 5 on the inner hub 6 between clamping members 1 and hub 6.

Figure 3:
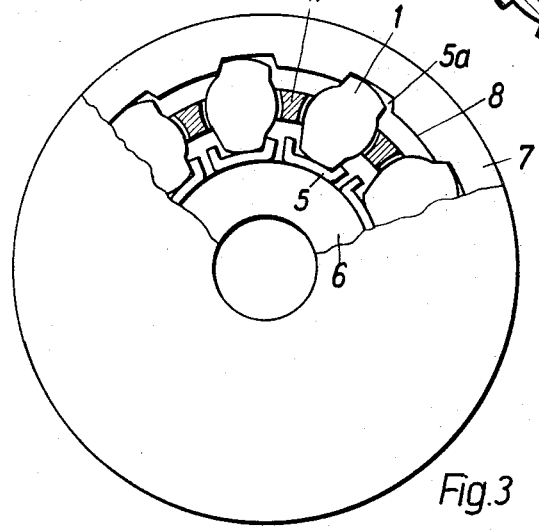
FIG. 3 is a partial section of still another modification of the present invention according to which the clamping members are held by a cage.

Such an arrangement is shown for instance in FIG. 3 which also shows the cage 11 having arranged therein the clamping members 1. Such an arrangement facilitates the assembly of the clamping members.

Figure 4:
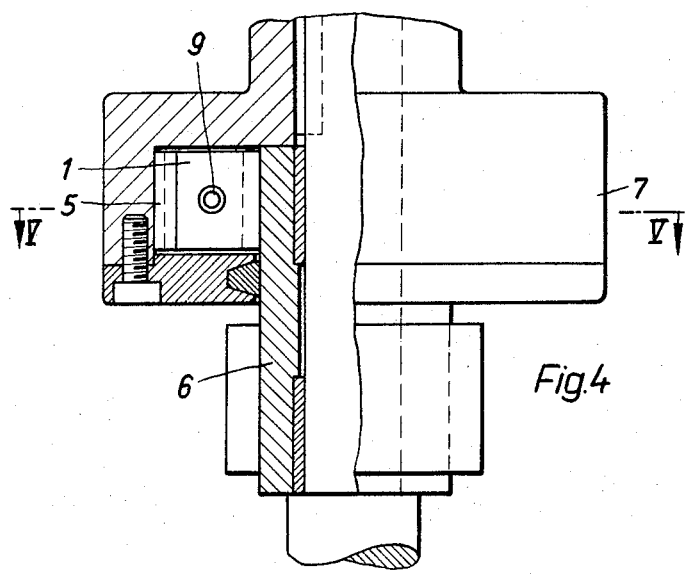
FIG. 4 illustrates partly in vertical section and partly in view an arrangement according to which the clamping members are by means of a spring continuously urged into clamping position.
Figure 5:
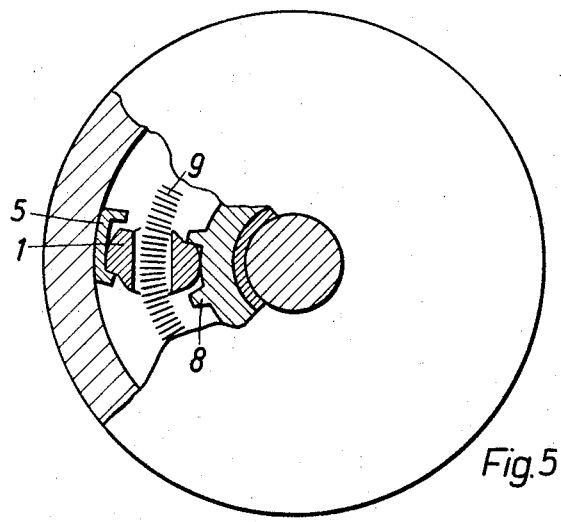
FIG. 5 is a section taken along the line V—V of FIG. 4.

According to a further development of the present invention, the clamping members 1 are by spring means, preferably an annular spring 9, continuously urged into clamping position in a direction counter to the normal direction of rotation of the clutch. This arrangement is shown for instance in FIGS. 4 and 5. As will be seen from these figures, the annular spring 9 extends through the clamping members 1.

Figure 6:
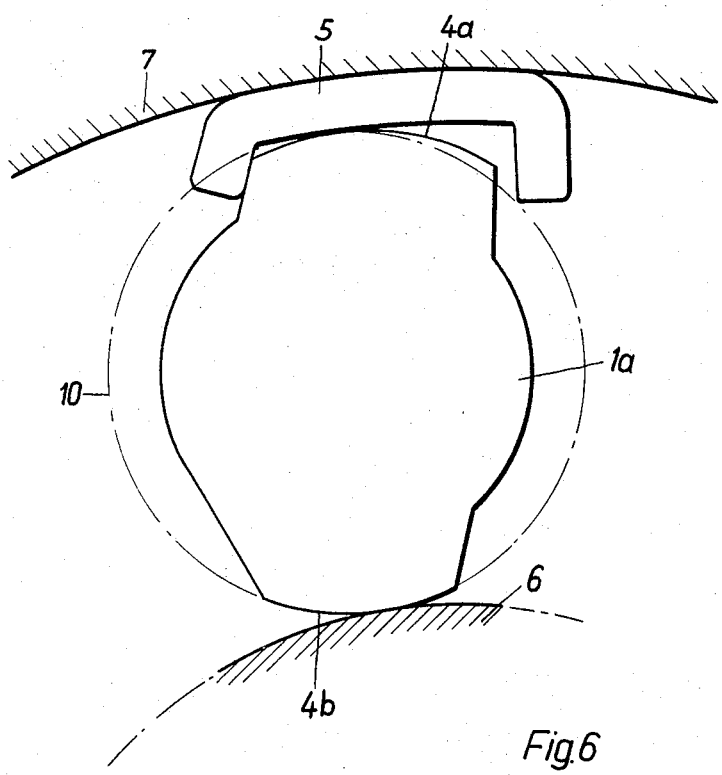
FIG. 6 illustrates a clamping member for use in connection with the present invention, which clamping member has its outer surface designed in conformity with the contour of a spiral, whereas its inner contour follows the contour of a circle.

FIG. 6 illustrates on a somewhat larger scale than the preceding figures a clamping member 1a having its outer surface 4a adjacent the output shaft 7 spiral-shaped. Spiral 4a is a so-called logarithmic spiral which has uniform pitch. Inner surface 4b of clamping member 1a which cooperates with drive shaft 6 follows a circular contour, the corresponding circle being indicated in dot-dash lines and designated with the reference numeral 10.

Finally, FIGS. 7 and 8 illustrate by way of example a clamping shoe as it may be used in connection with the present invention of specific dimensions.

It may be added that advantageously the curvature of the web section 5c of slide shoes 5 approximately corresponds to the curvature of the inner and outer running surfaces 2 and 3 respectively. It is also to be understood that the outer surface of shaft 6' which is engaged by clamping member 4 may be composed of sections of a spiral or may be cylindrical.

It is, of course, to be understood that the present invention is, by no means, limited to the particular constructions shown in the drawings but also comprises any modifications within the scope of the appended claims.

What I claim is:

1. A freewheel clutch system, which comprises: a rotatable driving member, a rotatable driven member substantially coaxially arranged with and in radially spaced relationship to said driving member, a plurality of circularly arranged clamping means interposed between said driving member and said driven member, and slide shoe means interposed between at least one of said members and said clamping means, said clamping means being operable in response to a relative rotary movement of said members in opposite directions with regard to each other to interlock said members, those surfaces of said clamping means and said slide shoe means which face each other forming rolling surfaces rolling on each other in response to said rotary movement.

2. An arrangement according to claim 1, in which each of said slide shoe means has an intermediate section having its outer surface in engagement with a portion of the respective adjacent one of said members and having its inner surface in rolling engagement with this respective adjacent clamping means, each of said slide shoe means also having two arms respectively arranged at the ends of said intermediate sections and extending in the front and the rear of the respective adjacent clamping means when viewing the direction of movement of said members.

3. A freewheel clutch system, which comprises: a rotatable driving member, a rotatable driven member substantially coaxially arranged with and in radially spaced relationship to said driving member, a plurality of circularly arranged clamping means interposed between said driving member and said driven member, a first group of slide shoe means interposed between said driving member and said clamping means, each of said slide shoe means having one surface in frictional sliding engagement with said driving member and having its opposite surface in rolling engagement with one of said clamping means, and a second group of slide shoe means interposed between said driven member and said clamping means, each of said slide shoe means of said second group having one surface in frictional sliding engagement with said driven member and having its opposite surface in rolling engagement with one of said clamping means, said clamping means being operable in response to a relative rotary movement of said members in opposite direction with regard to each other to interlock said members.

4. A freewheel clutch system, which comprises: a rotatable driving member, a rotatable driven member substantially coaxially arranged with and in radially spaced relationship to said driving member, a plurality of circularly arranged clamping means interposed between said driving member and said driven member, and a plurality of circularly arranged slide shoe means interposed between one of said members and said clamping means, each of said slide shoe means having one surface in frictional sliding engagement with one of said members and having its opposite surface in rolling engagement with the respective adjacent clamping means, each of said clamping means also having a surface in rolling engagement with a surface section of the other one of said members, said clamping means being operable in response to a relative movement of said members in opposite directions with regard to each other to interlock said members.

5. An arrangement according to claim 1, in which those surfaces of said clamping means which are adjacent to and face said slide shoe means follow the contour of a continuously rising spiral, those surfaces of said slide shoe means engaging said spiral-shaped surfaces of said clamping means having a substantially cylindrical contour.

6. A freewheel clutch system, which comprises: a rotatable driving member having a cylindrical inner surface, a rotatable driven member substantially coaxially arranged with and in radially spaced relationship to said driving member and having a cylindrical outer surface substantially coaxial with said cylindrical inner surface, a plurality of circularly arranged clamping means interposed between said driving member and said driven member, and slide shoe means interposed between at least one of said members and said clamping means, said clamping means being operable in response to a relative rotary movement of said members in opposite direction with regard to each other to interlock said members, each of said slide shoe means comprising a section curved approximately in conformity with the curvature of the respective adjacent one of said members.

7. An arrangement according to claim 1, in which said slide shoe means are formed by stamped curved elements.

8. A freewheel clutch system, which comprises: a rotatable driving member, a rotatable driven member substantially coaxially arranged with and in radially spaced relationship to said driving member, a plurality of circularly arranged clamping means interposed between said driving member and said driven member, slide shoe means interposed between at least one of said members and said clamping means, said clamping means being operable in response to a relative rotary movement of said members in opposite directions with regard to each other to interlock said members, those surfaces of said clamping means and said slide shoe means which face each other forming rolling surfaces rolling on each other in response to said rotary movement, and cage means holding and spacing from each other said clamping means.

9. A freewheel clutch system, which comprises: a rotatable driving member, a rotatable driven member substantially coaxially arranged with and in radially spaced relationship to said driving member, a plurality of circularly arranged clamping means interposed between said driving member and said driven member, slide shoe means interposed between at least one of said members and said clamping means, said clamping means being operable in response to a relative rotary movement of said members in opposite directions with regard to each other to interlock said members, those surfaces of said clamping means and said slide shoe means which face each other forming rolling surfaces rolling on each other in response to said rotary movement, and spring means associated with said clamping means and continuously urging the same into position for interlocking said members.

10. An arrangement according to claim 4, in which the surface sections of said other one of said members are separated from each other by extensions extending laterally of said clamping means and in the direction toward said slide shoe means.

References Cited

UNITED STATES PATENTS

| | | | |
|---|---|---|---|
| 2,364,280 | 12/1944 | Dodge | 192—45.1 |
| 2,388,424 | 11/1945 | Lund | 192—45.1 |
| 2,901,072 | 8/1959 | Maurer et al. | 192—45.1 |
| 2,998,874 | 9/1961 | McNeill | 192—41 X |

MARK NEWMAN, *Primary Examiner.*

ARTHUR T. McKEON, *Examiner.*